United States Patent
Lee et al.

(10) Patent No.: US 10,397,862 B2
(45) Date of Patent: Aug. 27, 2019

(54) WIRELESS COMMUNICATION METHOD FOR ENHANCING TRANSMISSION EFFICIENCY THROUGH SEPARATING TRANSMISSION INTERVAL IN WIRELESS LOCAL AREA NETWORK (WLAN) SYSTEM

(71) Applicant: ELECTRONICS AND TELECOMMUNICATIONS RESEARCH INSTITUTE, Daejeon (KR)

(72) Inventors: Jae Seung Lee, Daejeon (KR); Il Gyu Kim, Chungcheongbuk (KR); Jae Woo Park, Daejeon (KR); Yu Ro Lee, Daejeon (KR); Jee Yon Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 155 days.

(21) Appl. No.: 14/946,551

(22) Filed: Nov. 19, 2015

(65) Prior Publication Data

US 2016/0150557 A1 May 26, 2016

(30) Foreign Application Priority Data

Nov. 19, 2014 (KR) .......... 10-2014-0161655
Nov. 19, 2015 (KR) .......... 10-2015-0162445

(51) Int. Cl.
*H04W 4/00* (2018.01)
*H04W 52/02* (2009.01)
(Continued)

(52) U.S. Cl.
CPC ....... *H04W 52/0206* (2013.01); *H04W 74/04* (2013.01); *H04W 48/12* (2013.01);
(Continued)

(58) Field of Classification Search
CPC ......... H04W 52/0206; H04W 52/0216; H04W 74/00; H04W 74/04; H04W 74/06
See application file for complete search history.

(56) References Cited

U.S. PATENT DOCUMENTS 6,944,881 B1 * 9/2005 Vogel .................. H04L 12/2801
375/222
9,743,273 B2 * 8/2017 Gong .................. H04W 74/006
340/338

(Continued)

FOREIGN PATENT DOCUMENTS

WO WO 2014046453 A2 * 3/2014 ............ H04W 48/14

OTHER PUBLICATIONS

Nayanajith. <https://web.archive.org/web/20141114235646/https://mrncciew.com/2014/11/01/cwap-802-11-ctrl-ps-poll/>. Nov. 14, 2014.*

(Continued)

*Primary Examiner* — Anh Vu H Ly (57) ABSTRACT

Provided is a wireless communication method performed at an access point to enhance the transmission efficiency in a wireless local area network (WLAN) system, the method including scheduling a transmission time of an enhanced traffic indicator map (TIM) frame based on a type of a station, and transmitting a second beacon including the enhanced TIM frame to the station at a point in time aside from a transmission point in time of a first beacon.

20 Claims, 7 Drawing Sheets

(51) Int. Cl.
*H04W 74/04* (2009.01)
*H04W 84/12* (2009.01)
*H04W 48/12* (2009.01)

(52) U.S. Cl.
CPC ............. *H04W 84/12* (2013.01); *Y02D 70/00* (2018.01); *Y02D 70/1224* (2018.01); *Y02D 70/1262* (2018.01); *Y02D 70/1264* (2018.01); *Y02D 70/142* (2018.01); *Y02D 70/146* (2018.01); *Y02D 70/166* (2018.01)

(56) References Cited

U.S. PATENT DOCUMENTS

| | | | |
|---|---|---|---|
| 2004/0082356 A1* | 4/2004 | Walton | H04B 7/022 |
| | | | 455/522 |
| 2006/0079241 A1* | 4/2006 | Faccin | H04W 36/18 |
| | | | 455/450 |
| 2006/0153112 A1* | 7/2006 | Lim | H04L 5/0007 |
| | | | 370/310 |
| 2007/0297438 A1* | 12/2007 | Meylan | H04W 52/0225 |
| | | | 370/445 |
| 2012/0163263 A1 | 6/2012 | Oh et al. | |
| 2013/0155930 A1* | 6/2013 | Chu | H04W 52/0206 |
| | | | 370/311 |
| 2013/0258928 A1* | 10/2013 | Wong | H04W 56/001 |
| | | | 370/311 |
| 2014/0105186 A1 | 4/2014 | Park et al. | |
| 2014/0314019 A1 | 10/2014 | Hong et al. | |
| 2014/0334368 A1* | 11/2014 | Zhou | H04W 4/08 |
| | | | 370/311 |
| 2015/0009878 A1* | 1/2015 | Kim | H04W 52/0229 |
| | | | 370/311 |
| 2015/0085780 A1* | 3/2015 | Kim | H04W 52/0216 |
| | | | 370/329 |
| 2015/0215867 A1* | 7/2015 | Choi | H04W 48/14 |
| | | | 370/311 |
| 2015/0327262 A1* | 11/2015 | Kwon | H04W 72/1289 |
| | | | 370/329 |

OTHER PUBLICATIONS

Youngho Seok et al., "Uplink Channel Access General Procedure," Submission IEEE 802.11-12/0831r0, Jul. 2012, pp. 1-19, LG Electronics.

* cited by examiner

WIRELESS COMMUNICATION METHOD FOR ENHANCING TRANSMISSION EFFICIENCY THROUGH SEPARATING TRANSMISSION INTERVAL IN WIRELESS LOCAL AREA NETWORK (WLAN) SYSTEM

TECHNICAL FIELD

Embodiments relate to technology for performing wireless communication by distributing a transmission interval based on a type of a terminal in a wireless local area network (WLAN) system.

RELATED ART

In general, a local area network (LAN) that is a near field communication network is divided in a wired LAN and a wireless LAN (WLAN). The WLAN employs a method of performing communication on a network using propagation instead of using a cable. The WLAN has been introduced as an alternative for overcoming difficulties found in installation, maintenance and repair, and movement by cabling. According to an increase in mobile users, a need for the WLAN is also increasing.

The WLAN includes an access point and a station (STA) that is a terminal device. The access point refers to equipment that transmits propagation so that WLAN users present within a transmission distance may connect to the Internet and utilize a network. The access point may serve as a base station of a mobile phone or a hub of a wired network. In a wireless ultra high speed Internet service provided from an Internet service provider (ISP), access point equipment has been installed in a service area.

Currently, with a rapid increase in the use of the WLAN and the number of wireless terminals, the efficiency of the wireless WLAN has emerged as an issue in a highly dense environment. Since the performance of the WLAN is significantly degraded in a dense environment, a standardization of 802.11ax and the like is currently ongoing to outperform the above issue.

In a WLAN environment, a variety of terminals, for example, 11b, 11g, 11n, and 11ac terminals, are mixed even in the same basic service set (BSS). In particular, when there are many relatively old WLAN terminals, particularly, 11b and 11g terminals, the entire network performance may be degraded.

In the existing WLAN, in a case in which a power saving terminal listens to a beacon and in this instance, a buffered frame is present, the power saving terminal is to transmit a PS-poll and to receive buffered data from an access point. Thus, when a large number of terminals are present, a channel access may suddenly increase at a transmission point in time of a beacon. In the case of 11ah terminal, it is possible to prevent an occurrence of contention by grouping stations using a restricted access window (RAW) and by enabling different station groups to perform transmission in different time intervals. However, in the existing frequency band, such as 2.4 GHz or 5 GHz, legacy terminals do not follow a RAW operation and thus, the RAW may be readily introduced.

In the existing 802.11, micro beacons, such as a measurement pilot, a FILS discovery frame, and the like, are present. However, since such beacons are generally used to enhance a network discovery rate and do not have traffic indicator map (TIM) information, it may not be possible to prevent terminals from transmitting PS-polls at a time at a transmission point in time of a beacon.

DETAILED DESCRIPTION

Object

Embodiments provide a method that may prevent an occurrence of contention by distributing a transmission interval of terminals so that different device types of terminals may perform transmission in different time intervals even in 2.4 GHz and 5 GHz, and may prevent a degradation in the network performance by a legacy terminal by enabling a terminal, such as 11ac terminal and 11ax terminal, to perform transmission in a time interval different from a time interval of the legacy terminal.

Embodiments also provide a method of enhancing the transmission efficiency by distributing a transmission interval based on a device type that may prevent a degradation in the overall network efficiency and may also prevent contention from occurring at a specific point in time, when a legacy terminal is mixed.

Solution

According to an aspect, there is provided a wireless communication method performed at an access point, the method including scheduling a transmission time of an enhanced traffic indicator map (TIM) frame based on a type of a station, and transmitting a second beacon including the enhanced TIM frame to the station at a point in time aside from a transmission point in time of a first beacon. Here, a time length of the second beacon is less than a time length of the first beacon.

The scheduling may include allocating the same type of stations to the same TIM broadcast interval based on a power saving period.

The wireless communication method may further include receiving a request for a TIM broadcast interval from the station.

The scheduling may include scheduling the transmission time of the enhanced TIM frame to be the same interval as a legacy station in response to the number of power saving stations being less than a threshold.

The scheduling may include transmitting a TIM broadcast response to the station and allocating the station to a TIM broadcast group.

The scheduling may include determining a solicited/unsolicited response based on a bit included in a status field of the TIM broadcast response.

The enhanced TIM frame may include TIM information about stations included in the TIM broadcast group.

The wireless communication method may further include receiving a power save (PS)-poll from each of a plurality of stations, and simultaneously transmitting buffered data to the plurality of stations by performing downlink orthogonal frequency division multiple access (OFDMA) scheduling based on feedback information included in the PS-poll.

According to another aspect, there is provided a wireless communication method performed at a station, the method including receiving, from an access point at a point in time aside from a reception point in time of a first beacon, a second beacon including an enhanced TIM frame based on a type of the station, decoding the TIM frame, attempting a channel access at a transmission point in time of the second beacon based on TIM information if the station is capable of decoding the TIM frame, and setting a network allocation vector (NAV) if the station is incapable of decoding the TIM frame. Here, a time length of the second beacon is less than a time length of the first beacon.

The wireless communication method may further include verifying whether a TIM bit of the station is included in the TIM frame, if the station is capable of decoding the TIM frame, and transmitting a PS-poll to the access point in response to the TIM bit of the station being included in the TIM frame.

The wireless communication method may further include requesting a modification of a TIM broadcast interval by transmitting a TIM broadcast request to the access point.

The attempting may include transmitting, to the access point, a PS-poll including feedback information about a channel.

According to still another aspect, there is provided an access point including a communicator configured to transmit a first beacon and data to a station, and to receive a PS-poll from the station, and a processor configured to schedule a transmission time of an enhanced traffic indicator map (TIM) frame based on a type of the station. Here, the communicator is further configured to transmit a second beacon including the enhanced TIM frame to the station at a point in time aside from a transmission point in time of a first beacon, and a time length of the second beacon is less than a time length of the first beacon.

The processor may be further configured to allocate the same type of stations to the same TIM broadcast interval based on a power saving period.

The processor may be further configured to allocate adjacent association IDs (AIDs) to stations of which wakeup periods are the same or in a multiple relationship.

The processor may be further configured to allocate the same TIM broadcast interval to stations having adjacent TIM broadcast intervals without a request from the stations in response to a predetermined or more number of stations having different TIM broadcast intervals, and to reallocate AIDs of the stations.

According to still another aspect, there is provided a station including a communicator configured to receive, from an access point at a point in time aside from a reception point in time of a first beacon, a second beacon including an enhanced TIM frame, and a processor configured to decode the enhanced TIM frame. Here, the processor is further configured to attempt a channel access at a transmission point in time of the second beacon based on TIM information decoded from the enhanced TIM frame if the station is capable of decoding the TIM frame, and to set a NAV if the station is incapable of decoding the TIM frame. Here, a time length of the second beacon is less than a time length of the first beacon.

Effect

According to embodiments, it is possible to decrease a collision by distributing transmission intervals of terminals to be uniform across a beacon interval instead of performing transmission at a specific point in time, such as a beacon transmission time. Further, it is possible to reduce a standby time in a wakeup state by data transmission, thereby enhancing the power saving efficiency.

According to embodiments, it is possible to prevent a degradation in the performance of a high throughput terminal by a legacy terminal by distributing transmission intervals of terminals having different types, for example, a legacy terminal and high throughput terminal in an existing WLAN band such as 2.4 GHz and 5 GHz. Further, it is possible to enhance the performance of the entire WLAN by preventing contention between terminals from increasing in a specific time interval.

BRIEF DESCRIPTION OF THE DRAWINGS

These and/or other aspects, features, and advantages of the present disclosure will become apparent and more readily appreciated from the following description of embodiments, taken in conjunction with the accompanying drawings of which.

DETAILED DESCRIPTION

Hereinafter, embodiments are described below to explain the present disclosure by referring to the figures. The description to be provided in the following with the accompanying drawings is not to describe only an embodiment that may carry out the present disclosure and may include details to provide the full understanding of the present disclosure. However, it will be understood by one skilled in the art that the present disclosure may be implemented without the details.

The embodiments combine constituent elements and features of the present disclosure in a predetermined form. Each constituent element or feature may be considered being selective unless particularly explicitly described. Additionally, each constituent element or feature may be implemented without being combined with another constituent element or feature. Also, embodiments may be configured by combining some constituent elements and/or features. Order of operations described in the embodiments may be changed. A portion of configurations or features of a certain embodiment may be included in another embodiment and may also be replaced with a corresponding configuration or feature of another embodiment.

Terms used in the following are provided to help the understanding of the present disclosure and accordingly, the use of such a specific term may be modified in another form without departing from the technical spirit of the present disclosure.

In some cases, known structures and apparatuses are omitted or illustrated in a form of a block diagram based on key functions of each structure and apparatus in order to prevent the concept of the present disclosure from being ambiguous. Also, like reference numeral refer to like constituent elements throughout.

Embodiments may be supported by standard documents disclosed in at least one of an Institute of Electrical and Electronics Engineers (IEEE) 802 system, a $3^{rd}$ Generation Partnership Project (3GPP) system, a 3GPP Long Term Evolution (LTE) system, an LTE-advanced (LTE-A) system, and a 3GPP2 system. That is, operations or portions not described to clearly disclose the technical sprit of the present disclosure may be supported by the documents. Further, all of the terms disclosed herein may be explained by the standard document.

The following technology may be employed for various wireless systems, for example, a code division multiple access (CDMA), a frequency division multiple access (FDMA), a time division multiple access (TDMA), an orthogonal frequency division multiple access (OFDMA), a single carrier frequency division multiple access (SC-FDMA), and the like. The CDMA may be configured using radio technology, for example, universal terrestrial radio access (UTRA) and CDMA2000. The TDMA may be configured using radio technology, for example, global System for Mobile communications (GSM)/General Packet Radio Service (GPRS)/Enhanced Data Rates for GSM Evolution (EDGE). The OFDMA may be configured using radio technology, for example, IEEE 802.11 (Wi-Fi), IEEE 802.16 (WiMAX), IEEE 802-20, and Evolved UTRA (E-UTRA). For clarity of the description, the description will be made based on the IEEE 802.11 system. However, it is only an example and thus, the technical sprit of the present disclosure is not limited thereto.

Hereinafter, embodiments will be described with reference to the accompanying drawings.

Figure 1:
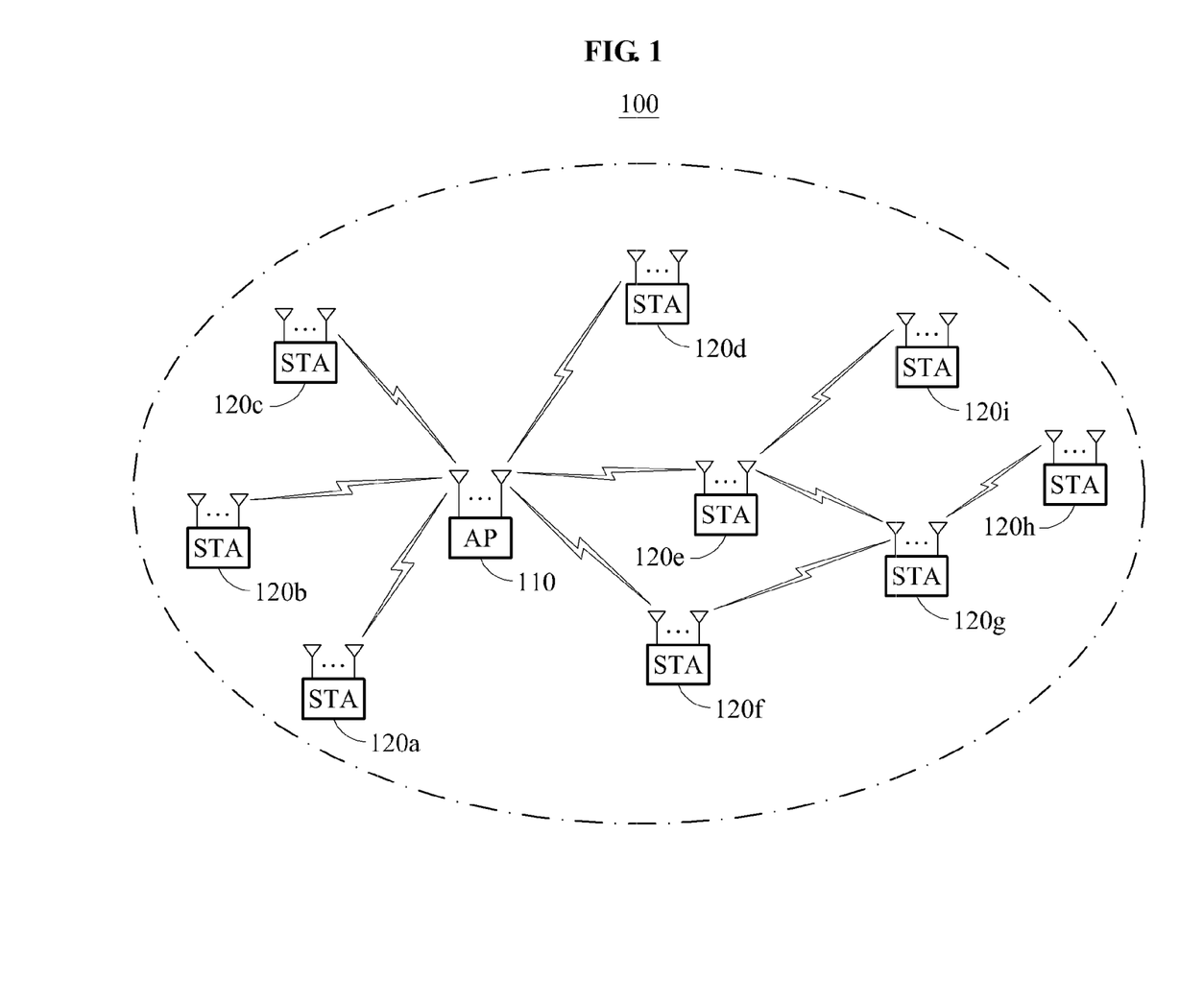
FIG. 1 is a diagram illustrating an example of a wireless local area network (WLAN) environment according to an embodiment.

FIG. 1 is a diagram illustrating an example of a wireless local area network (WLAN) environment according to an embodiment.

A WLAN system 100 may include at least one basic service set (BSS). The WLAN system 100 may include an access point (AP) 110 and stations (STAs) 120a, 120b, 120c, 12d, 120e, 120f, 120g, 120h, and 120i. For clarity of description, the AP 110 is illustrated to be in a singular form in FIG. 1. However, it is only an example and a plurality of APs 100 may be provided.

The AP 110 refers to a functional entity that provides a connection to the WLAN system 100 through a wireless medium for an STA connected to, that is, associated with the AP 110. The AP 110 may communicate with at least one STA at a predetermined point in time in a downlink and an uplink. The downlink refers to a communication link from the AP 110 to the STAs 120a through 120i, and the uplink refers to a communication link from the STAs 120a through 120i to the AP 110.

The term "station (STA)" used herein may also be referred to as a different name, for example, a mobile terminal or a terminal, a wireless device, a wireless transmit/receive unit (WTRU), user equipment (UE), a mobile station (MS), a mobile subscriber unit (MSU), and simply a user, and may be configured using the same.

The AP 110 may simultaneously transmit data to an STA group including at least one of the STAs 120a through 120i associated with the AP 110.

The WLAN system 100 supports a multi-user multiple input multiple output (MU-MIMO) communication. In a MU-MIMO communication system, the AP 110 may transmit a plurality of space streams to a plurality of STAs using multiple antennas. Also, when the AP 110 uses a plurality of transmit antennas, the AP 110 may transmit a data frame to the STAs 120a through 120i using beamforming technology to enhance the transmission performance.

In the WLAN system 100, when the AP 110 performs frequency-selective transmission using a narrowband subchannel in a wideband BSS, the AP 110 may simultaneously perform frequency-selective transmission using different subchannels.

Since the AP 110 simultaneously performs frequency selective transmission through orthogonal subchannels in an MU-MIMO communication mode, a network throughput may be enhanced compared to frequency selective transmission using a single subchannel.

The AP 110 may require channel information about STAs to which the AP 110 is to transmit a data frame, and may perform channel sounding to acquire the channel information. Channel sounding refers to a feedback procedure of channel status information, and may be performed based on a null data packet (NDP) frame and an NDP announcement (NDPA) frame. The NDP frame has a PLCP protocol data unit (PPDU) format in which a data field of a media access control (MAC) layer is excluded and may also be referred to as a sounding frame. A PLCP represents a physical layer convergence procedure. The AP 110 may use the NDP frame to extract channel information from an STA.

The STA may perform channel estimation based on the NDP frame received from the AP 110, and may feed back channel status information to the AP 110 as a channel estimation result. For example, the STA may estimate a MIMO communication channel based on a very high throughput-long training field (VHT-LTF) of the NDP frame, and may acquire channel information.

The NDPA frame may be transmitted to inform which STA is to receive the NDP frame, and may also be referred to as a sounding announcement frame. The STA may determine whether the STA itself is to participate into channel sounding, based on the NDPA frame. The AP 110 may include information about a target STA of channel sounding in the NDPA frame and thereby transmit the NDPA frame to the target STA. The AP 110 may instruct the STA to receive the NDP frame using the NDPA frame.

The AP 110 may transmit the NDPA frame and the NDP frame based on a RAW. The RAW refers to a time interval in which a channel access is allowed only to specific STAs and is not allowed to other STAs.

The AP 110 uses a plurality of transmit antennas and a plurality of receive antennas to transmit data in the downlink and the uplink. Each of the STAs 120a through 120i may include at least one antenna. The STAs 120a through 120i may have the same or different number of antennas.

According to an embodiment, in the WLAN system 100 that supports an OFDMA, the AP 110 may schedule communication with STAs for simultaneous transmission using frequency resources with different bandwidths and may match transmission points in times of frames and lengths of the frames. Accordingly, even in an asynchronous WLAN, simultaneous transmission may be performed through frame synchronization in the case of exchanging frames within a transmission opportunity (TxOP) acquired by the AP 110. Through this, a network throughput may be enhanced.

In subchannel selective transmission as frequency selective transmission, each of the STAs 120a through 120i may select a single subchannel for each beacon interval and may exchange a frame with the AP 110 through the selected subchannel. Here, each of the STAs 120a through 120i within a single beacon interval may not perform subchannel selective transmission by moving to another subchannel provided from the AP 110 and may not also transmit a frame using a plurality of subchannels. Accordingly, an STA may not readily use an optimal frequency resource according to traffic or a fast channel change. To use the optimal frequency resource according to traffic or a fast channel change, the OFDMA that allocates a variable resource based on a situation of an STA and enables the STA to use the allocated resource is to be employed.

Since a WLAN terminal, for example, an STA, is to transmit a PS-poll to the AP 100 in response to a received beacon and is to receive buffered data from the AP 100, contention may rapidly increase at a transmission point in time of the beacon. The STA is to be in a wakeup state by a transmission point in time of a downlink frame after transmitting the PS-poll. However, due to the increase in contention, a transmission standby time may further increase, thereby degrading the transmission efficiency and the power saving efficiency. In particular, when a legacy STA is mixed, the efficiency of a high throughput STA is degraded. Accordingly, transmission of a high throughput STA such as 11ac STA and 11ax STA and transmission of the legacy STA may be performed in different time intervals. Further, it is possible to decrease a collision by distributing data transmission intervals of STAs to be uniform across a beacon transmission interval instead of performing transmission at a specific point in time, such as a beacon transmission time. Further, it is possible to reduce a standby time in a wakeup state by data transmission, thereby enhancing the power saving efficiency. The aforementioned beacon refers to a beacon disclosed in the related art and is referred to as a first beacon.

In the case of 11ah, contention may be distributed using a RAW. However, a legacy STA present in 2.4 GHz or 5 GHz ignores the contention and thus, may not function properly.

According to embodiments, there is provided a method that may distribute data transmission points in times of 11ax STA and not-11ax STA, particularly, PS-poll transmission points in times that cause the contention.

According to embodiments, a micro beacon including only minimum information for distributing a transmission interval may be transmitted at a point in time different from a point in time of a first beacon based on a sleep period of an STA. Here, the micro beacon is also referred to as a second beacon. The minimum information may include, for example, traffic indicator map (TIM) information, timestamp information, STA-AP synchronization information, and optimal TIM information. The latest STA such as 11ax STA may attempt a channel access, for example, attempt to transmit a PS-poll at a transmission point in time of the second beacon, instead of a transmission point in time of the first beacon. Accordingly, it is possible to prevent the contention from increasing at the transmission point in time of the first beacon and to prevent the degradation in the performance by a simultaneous access attempt with a legacy STA.

To enhance the power saving efficiency of an STA in 11w, a TIM broadcast has introduced so that power saving STAs may be in a sleep state for a relatively long period than an interval of the first beacon and may perform transmission at a relatively high rate compared to the first beacon. By applying the TIM broadcast, the STA may have no need to listen to a first beacon frame, and may receive a TIM frame including a TIM element, which is transmitted at a point in time requested by the STA, may verify whether buffered data is present in the TIM frame, and may transmit a PS-poll at the requested point in time.

However, in the existing 11w TIM broadcast, the entire TIM elements are included in a TIM frame. Thus, a frame size may increase. Since the TIM frame is a frame to be additionally transmitted in addition to a beacon, network traffic may increase. According to embodiments, different device types of STAs may be distributed to different intervals and the TIM frame to be additionally transmitted in addition to the beacon may be optimized and thereby used. Accordingly, it is possible to distribute contention and to prevent a degradation in the performance occurring due to coexistence between a legacy STA and a high throughput STA.

Figure 2:
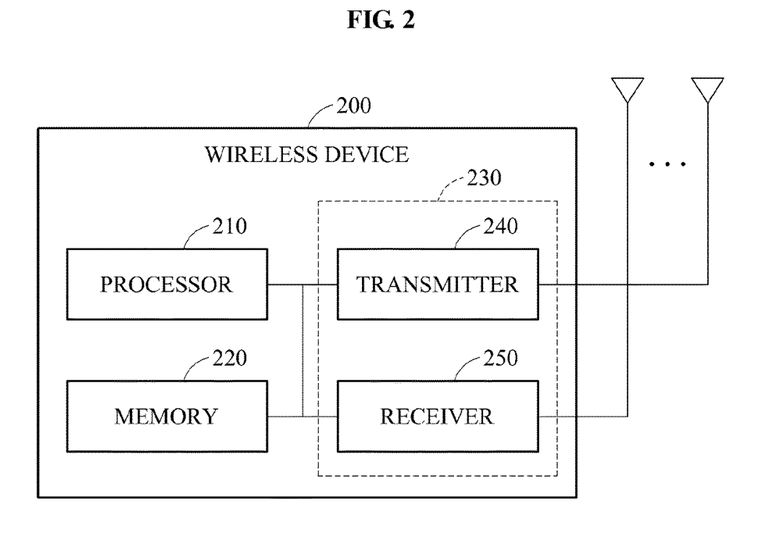
FIG. 2 is a block diagram illustrating a configuration of a wireless device applicable in a WLAN system according to an embodiment.

FIG. 2 is a block diagram illustrating a configuration of a wireless device applicable in a WLAN system according to an embodiment.

Referring to FIG. 2, the wireless device 200 may include a processor 210, a memory 220, and a communicator 230.

The wireless device 200 is an example of a device that may be configured to implement a variety of methods disclosed herein. The wireless device 200 may be an AP or an STA according to an embodiment.

The wireless device 200 includes the processor 210 configured to control an operation of the wireless device 200. The processor 210 may also be referred to as a central processing unit (CPU). The memory 220 may provide program instructions and data to the processor 210 and may include all of read only memory (ROM) and random access memory (RAM). In general, the processor 210 may perform a logic operation and an arithmetic operation based on the program instructions stored in the memory 220. Also, the processor 210 may detect and quantify signals received by the communicator 230. The program instructions stored in the memory 220 may be executed to implement the methods disclosed herein.

The wireless device 200 may include the communicator 230 to communicate with other devices. The communicator 230 may include a transmitter 240 and a receiver 250, and may be controlled by the processor 210. The wireless device 200 may include one or more antennas. The antennas may be electrically coupled with the communicator 230.

According to an embodiment, when the wireless device 200 operates as an AP, the receiver 240 may receive a frame from each STA through one of subchannels, via at least one antenna. The transmitter 250 may transmit resource scheduling information to each STA based on a subchannel selected at each STA via at least one antenna. A subchannel selected at an STA may be identified based on the subchannel through which a frame of the STA is transmitted.

According to an embodiment, when the wireless device 200 operates as an STA, the transmitter 250 may transmit a frame to an AP through a preferred subchannel among subchannels, via at least one antenna. The AP may transmit NDP frames to STAs through subchannels sequentially or simultaneously. Each of the STAs may receive an NDP frame, and may perform channel estimation about a subchannel based on the received NDP frame. The STA may determine a preferred subchannel based on a channel estimation result and may inform the AP of information about the preferred subchannel by transmitting a frame through the preferred subchannel. The receiver 240 may receive resource scheduling information from the AP via at least one antenna. The resource scheduling information may be determined based on a subchannel selected at each STA.

Hereinafter, an example in which the wireless device 200 operates as an AP will be described.

The communicator 230 may include the transmitter 240 configured to transmit a first beacon and data to an STA and the receiver 250 configured to receive a PS-poll from the STA. Here, the transmitter 240 may transmit a second beacon including an enhanced TIM frame at a point in time aside from a transmission point in time of the first beacon.

The processor 210 may schedule a transmission time of the enhanced TIM frame based on the STA. Here, the processor 210 may allocate the same type of STAs to the same TIM broadcast interval based on a power saving period. Here, through introduction of a TIM broadcast group concept, it is possible to enhance the power saving efficiency and the transmission efficiency of an STA by allocating 11ax STAs having the same or similar power saving periods to the same TIM broadcast interval and by protecting transmission so that only the 11ax STAs may perform transmission in the corresponding TIM broadcast interval.

The processor 210 may allocate adjacent association IDs (AIDs) to STAs of which wakeup periods are the same or in a multiple relationship. That is, when a wakeup period of an STA is the same as a wakeup period of another STA, or when the wakeup period of the STA is multiples of the wakeup period of the other STA, it is possible to generate a further effective TIM bitmap by allocating adjacent AIDs to the STAs.

That is, in many cases, STAs of which wakeup periods are the same or in the multiple relationship may wake up simultaneously. The STAs may be allocated to the same STA group or different STA groups. Further, TIM IEs about STA groups may be included in the same TIM frame. The AP may transmit a TIM frame at a point in time at which a corresponding STA group wakes up, and may include only a TIM element about the STA group that wakes up at the point in time, thereby reducing a TIM bitmap size and traffic increase.

For example, the AP may transmit TIM elements about all of STAs of which wakeup periods are the same as "2" or of which wakeup periods are "2" and "4" through a one-time TIM broadcast. Here, since the entire TIM bitmap is not transmitted, a size of a TIM frame is relatively small. In addition, a probability that an STA is capable of receiving the TIM frame at a wakeup point in time of the STA may increase. Accordingly, the STA has no need to wake up further frequently than a wakeup period of the STA in order to receive the TIM frame.

When a predetermined or more number of STAs have different TIM broadcast intervals, the processor 210 may allocate the same TIM broadcast interval to STAs having adjacent TIM broadcast intervals without a separate request from the STAs, and may reallocate AIDs of the STAs.

When a TIM broadcast interval is modified, the communicator 230 may transmit, to an STA, a TIM broadcast response element including the modified TIM broadcast interval and status.

Hereinafter, an example in which the wireless device 200 operates as an STA will be described.

The communicator 230 may receive, from an AP, a second beacon including an enhanced TIM frame, and may transmit, to the AP, a PS-poll for attempting a channel access. Here, the communicator 230 may transmit, to the AP, the PS-poll including feedback information about a channel when attempting the channel access.

The communicator 230 may receive, from the AP, the second beacon including the enhanced TIM frame based on a type of an STA. Here, a time length of the second beacon is less than a time length of the first beacon.

The processor 210 may decode the enhanced TIM frame. Here, when an STA is an 11ax STA having a relatively high throughput, the STA may decode the enhanced TIM frame and may attempt a channel access at a transmission point in time of the second beacon based on TIM information decoded from the enhanced TIM frame. However, when the STA is non-11ax STA, the STA may not decode the enhanced TIM frame and thus, may set a NAV based on only a duration field of the TIM frame.

When the STA is capable of decoding the TIM frame, the processor 210 may verify whether a TIM bit of the STA is included in the TIM frame. Here, in response to the TIM bit of the STA being included in the TIM frame, the communicator 230 may ignore the NAV and may transmit a PS-poll.

The processor 210 may request a modification of a TIM broadcast interval by transmitting a TIM broadcast request element to the AP based on at least one of an association time and an after-association time.

Figure 3:
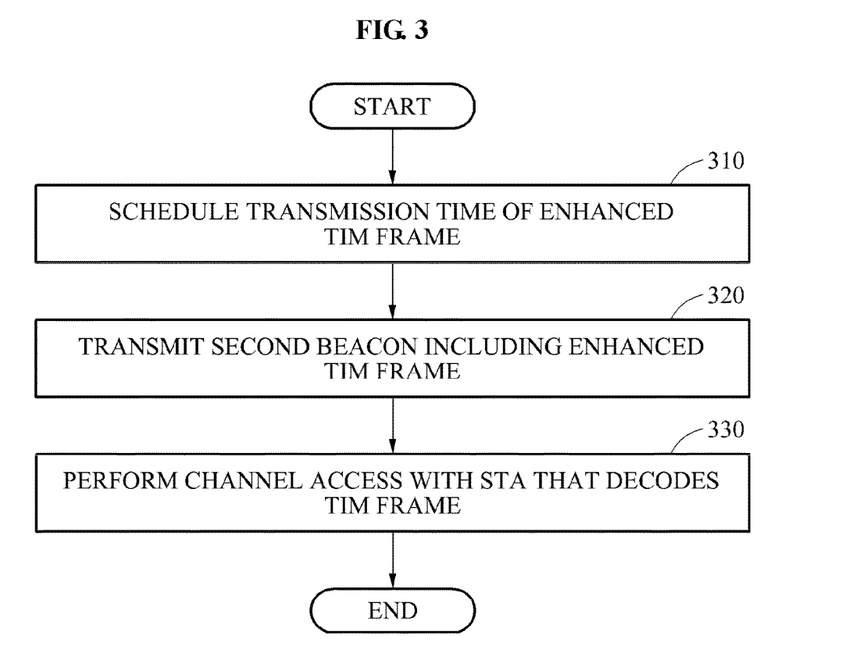
FIG. 3 is a flowchart illustrating a wireless communication method for enhancing the transmission efficiency at an access point according to an embodiment.

FIG. 3 is a flowchart illustrating a wireless communication method for enhancing the transmission efficiency at an AP according to an embodiment.

Referring to FIG. 3, in operation 310, the AP may schedule a transmission time of an enhanced TIM frame.

Here, the enhanced TIM frame may include only TIM information about a corresponding STA group.

The AP may allocate the same type of STAs to the same TIM broadcast interval based on a power saving period. Through this, by distributing different types of STAs to different intervals and by optimally using an enhanced TIM frame of a second beacon that additionally transmitted in addition to a first beacon, contention may be distributed without an increase in network load. Further, it is possible to prevent a degradation in the performance occurring due to coexistence between a legacy STA and a high throughput STA.

Here, when the number of power saving STAs is not large, the AP may schedule a time interval for the power saving STAs to be the same as a time interval of the legacy STA.

The AP may allocate 11ax STA to a TIM broadcast group by transmitting an unsolicited TIM broadcast response. In the related art, in response to a TIM broadcast request from an STA, the AP may schedule a TIM broadcast for the corresponding STA. According to an embodiment, without a separate request, the AP may allocate 11ax STA to a TIM broadcast group by transmitting the unsolicited TIM broadcast response based on the determination of the AP. For example, the AP may determine that scheduling is required when traffic increases or when contention exponentially increases at a transmission time of the first beacon.

According to an embodiment, the AP may identify a solicited/unsolicited response based on a reserved bit in a status field of the TIM broadcast response. A description related thereto will be made with reference to the following Table 1.

In operation 320, the AP may transmit a second beacon including the enhanced TIM frame at a point in time aside from the transmission point in time of the first beacon. The AP may transmit the second beacon including TIM information of the STA, and latest STAs capable of decoding the second beacon may verify a TIM frame at a transmission point in time of the second beacon.

In operation 330, the AP may perform channel access with an STA that decodes the TIM frame. The latest STAs including 11ax STA may transmit a PS-poll at a transmission point in time of the second beacon in addition to a transmission point in time of the first beacon, thereby achieving the contention distribution effect.

According to an embodiment, the wireless communication method for enhancing transmission efficiency at the AP may further include receiving a request for a TIM broadcast interval from the STA.

According to an embodiment, the wireless communication method of enhancing transmission efficiency at the AP may further include receiving a PS-poll from each of a plurality of STAs, for example, 11ax STAs, and simultaneously transmitting buffered data to the plurality of STAs, for example, 11ax STAs, by performing downlink OFDMA scheduling based on feedback information included in the PS-poll. Accordingly, when 11ax STAs gather and transmit data in a specific time interval, 11ax STAs may further efficiently transmit data, thereby enhancing the network throughput.

Figure 4:
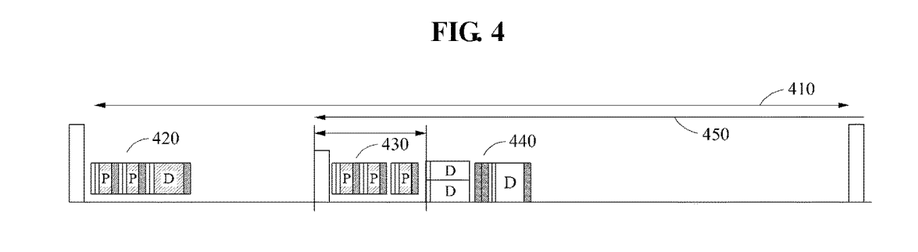
FIG. 4 illustrates an example of distributing a transmission interval using an enhanced traffic indicator map (TIM) frame according to an embodiment.

FIG. 4 illustrates an example of distributing a transmission interval using an enhanced TIM frame according to an embodiment.

Referring to FIG. 4, a beacon interval 410 between first beacons 401 including TIM information may be verified. Here, a legacy STA may transmit a PS-poll 420 to an AP and may perform downlink from the AP.

The AP may transmit a second beacon 402 including TIM information of an STA at a point in time aside from a transmission point in time of the first beacon 401, and latest STAs capable of decoding the second beacon 402 may verify a TIM frame at a transmission point in time of the second beacon 402 and thus, may transmit a PS-poll 430 at the transmission point in time of the second beacon 402 in addition to the transmission point in time of the first beacon 401, thereby achieving a contention distribution effect. Hereinafter, for clarity of description, 11ax STA is assumed to be capable of decoding the second beacon 402. Here, a TIM broadcast interval 450 refers to a time interval after the second beacon 402. The AP may transmit the PS-poll 430 and may perform downlink transmission 440.

In a TIM broadcast method, an STA may verify a TIM frame at a point in time suitable for a sleep period of the STA by requesting an AP for a TIM broadcast interval using a TIM broadcast request element. Even a legacy STA is to verify a beacon frame. Accordingly, although a TIM frame is transmitted at a lowest rate, STAs, for example, relatively recent STAs, capable of decoding a TIM frame may verify the TIM frame and thus, the TIM frame may be transmitted at a relatively high rate. Accordingly, STAs may receive the TIM frame within a further short time compared to the first beacon.

According to an embodiment, an AP may prevent an access of a legacy STA by setting a NAV with respect to a predetermined interval after a TIM frame based on a duration field of the TIM frame. Through this, it is possible to protect a transmission of a high throughput STA that wakes up at a transmission point in time of the TIM frame and performs channel access. When a TIM bit of 11ax STA is included in the TIM frame, 11ax STA may ignore a NAV set to the TIM frame and may allow transmission of a PS-poll. A legacy STA that does not decode a TIM frame may not verify a TIM frame and thus, may not perform transmission during a corresponding interval. Also, since 11w STA capable of decoding the TIM frame does not perform channel access due to a NAV set to the TIM frame, only the 11ax STA may perform transmission in a predetermined time interval immediately after transmitting a second beacon.

When only 11ax STA is allowed to perform transmission in a specific time interval, it is possible to use a further enhanced function such as OFDMA of 11ax STA. The transmission efficiency may be further enhanced in such a manner that 11ax STA transmits a PS-poll immediately after transmitting a second beacon and the AP receives PS-polls from a plurality of 11ax STAs and simultaneously transmits buffered data to a plurality of 11ax STAs using OFDMA. Also, 11ax STA may include feedback information about a channel when transmitting the PS-poll to the AP. In this case, the AP may perform downlink OFDMA scheduling based on the feedback information and may perform further effective downlink transmission while reducing overhead for separately transmitting feedback information. As described above, when 11ax STAs gather and perform transmission in a specific time interval, further efficient transmission may be performed, thereby enhancing the network output.

Even a transmission interval after a PS-poll interval may be protected from transmission of a non-high efficiency WLAN (non-HEW) STA during a predetermined period of time by increasing a value of a duration field of the TIM frame.

The TIM broadcast method refers to a method that enables a power saving STA to listen to only a TIM frame with a length less than a length of a beacon instead of listening to the beacon and has been introduced since 11w.

When using the above method, a low throughput STA may verify a TIM frame only using a beacon frame, which is similar to the related, and thus, may transmit a PS-poll at a transmission point in time of a beacon. An STA such as 11ax STA may verify a TIM frame at a transmission point time of a TIM frame selected by the STA and may transmit PS-poll. Accordingly, different types of devices may transmit a PS-poll in different time intervals.

Figure 5:
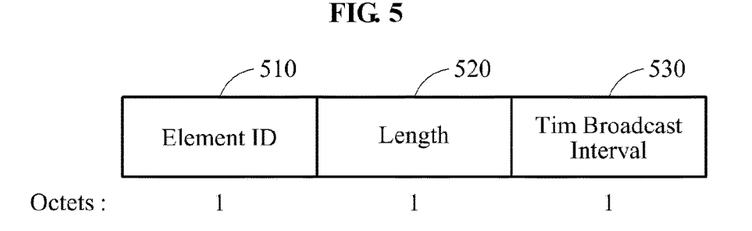
FIG. 5 illustrates a format of a TIM broadcast request element according to an embodiment.

FIG. 5 illustrates a format of a TIM Broadcast Request element according to an embodiment.

Referring to FIG. 5, the TIM broadcast request element may include an element ID field 510, a length field 520, and a TIM broadcast interval field 530.

An STA may request an AP for a TIM broadcast interval by including a TIM broadcast request element in an association request frame or a TIM broadcast request frame. The AP may schedule a transmission time of a TIM frame based on the corresponding STA using the TIM broadcast request element.

Figure 6:
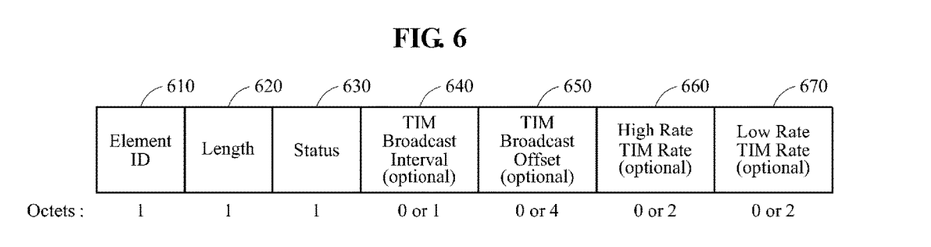
FIG. 6 illustrates a format of a TIM broadcast response element according to an embodiment.

FIG. 6 illustrates a format of a TIM broadcast response element according to an embodiment.

Referring to FIG. 6, the TIM broadcast response element may include an element ID field 610, a length field 620, a status field 630, a TIM broadcast interval field 640, a TIM broadcast offset field 650, a high rate TIM rate field 660, and a low rate TIM rate field 670.

Information about a TIM broadcast interval allowed by an AP, a TIM transmission rate, and the like, may be included in the TIM broadcast response element or an association response and thereby be transmitted to an STA.

Figure 7:
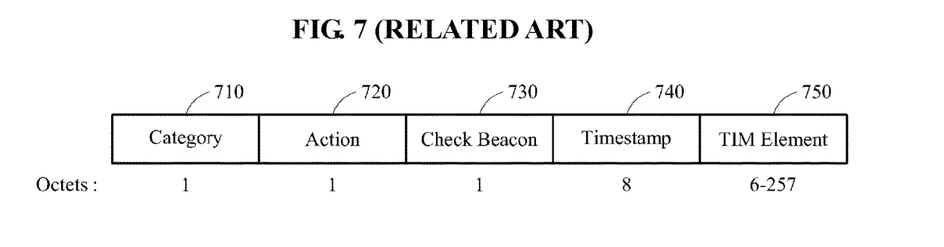
FIG. 7 illustrates a format of a TIM frame used in a TIM Broadcast according to the related art.

FIG. 7 illustrates a format of a TIM frame used in a TIM broadcast according to the related art.

Referring to FIG. 7, the TIM frame may include a category field 710, an action field 720, a check beacon field 730, a timestamp field 740, and a TIM element field 750.

A wireless communication method for enhancing the transmission efficiency by distributing a transmission interval according to an embodiment may employ a TIM broadcast group concept and may allocate only STAs, for example, 11ax STAs, having the same or similar power saving periods to the same TIM broadcast interval, for example, the same TIM broadcast group and may allow transmission only to the allocated STAs, for example, 11ax STAs. Accordingly, it is possible to enhance the power saving efficiency and the transmission efficiency of an STA.

The following Table 1 shows explanations of status field values of the TIM broadcast response.

TABLE 1

| Field value | Explanation |
| --- | --- |
| 0 | Accept |
| 1 | Accept, valid timestamp present in TIM frames |
| 2 | Denied |
| 3 | Overridden |
| 4~255 | Reserved |

The AP may inform an STA that the STA is allocated to a TIM broadcast group which only comprises HEW STAs by allocating reserved bit "1" to a status field of the TIM broadcast response element. For example, it is possible to redefine and use status field "4" as Accept & HEW only group and status field "5" as Accept & valid timestamp & HEW only group.

When the number of power saving STAs is determined to be relatively small, the AP may allow a non-HEW STA and a HEW STA to be allocated to the same time interval.

An existing standard may schedule a TIM broadcast for a corresponding STA only in response to a TIM broadcast request. However, according to an embodiment, without a separate request, it is possible to allocate a corresponding STA, for example, 11ax STA, to a TIM broadcast group by transmitting an unsolicited TIM broadcast response. Here, a solicited response and an unsolicited response may be identified based on a single reserved bit of a status field. For example, when status field "6" is set, the status field "6" may be identified as the unsolicited response.

Figure 8:
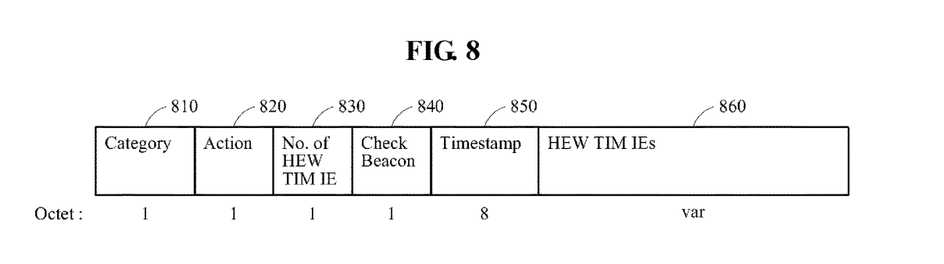
FIG. 8 illustrates a format of a TIM frame of an enhanced TIM frame according to an embodiment.

FIG. 8 illustrates a format of a TIM frame of an enhanced TIM frame according to an embodiment.

Referring to FIG. 8, the TIM frame of the enhanced TIM frame may include a category field 810, an action field 820, a No. of HEW TIM IE field 830, a check beacon field 840, a timestamp field 850, and HEW TIM IEs field 860. Compared to the related art, the No. of HEW TIM IE field 830 and the HEW TIM IEs field 860 are added.

Figure 9:
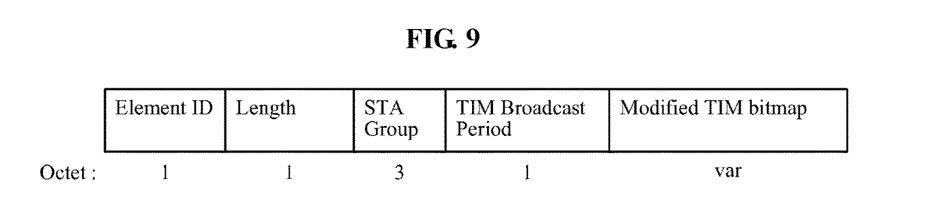
FIG. 9 illustrates a format of a modified TIM information element (IE) of an enhanced TIM frame according to an embodiment.

FIG. 9 illustrates a format of a modified TIM IE of an enhanced TIM frame according to an embodiment.

Referring to FIG. 9, the modified TIM IE of the enhanced TIM frame may include an element ID field 910, a length field 920, an STA group field 930, a TIM broadcast period field 940, and a modified TIM bitmap field 950.

Non-11ax (non-HEW) STA, which is an existing terminal, that is, STA, does not support the enhanced TIM frame. Accordingly, in the case of a TIM broadcast request from non-11ax (non-HEW) STA, non-11ax (non-HEW) STA may perform transmission at a point in time different from a point in time of a TIM broadcast of 11ax (HEW) STA using an existing TIM frame. Through this, 11ax (HEW) STA and non-11ax (non-HEW) STA may transmit PS-polls and data in different time intervals.

The format of the enhanced TIM frame may be available only to a device that supports 11ax (HEW) or more. Non-11ax (non-HEW) STA may defer a channel access during a corresponding duration of the enhanced TIM frame by setting a NAV based on only the duration of the enhanced TIM frame. Accordingly, transmission of the 11ax (HEW) STA may be protected.

The existing TIM frame includes only a single TIM element and indicates TIM bits by including 802.11 partial virtual bitmap. The 802.11 partial virtual bitmap does not have a grouping concept. All of first through last portions in which "1" appears may be included in a single TIM element, which may be inefficient.

TABLE 2

| AID: | STA1 | STA2 | STA3 | STA4 | STA5 | STA6 | ... | STA1995 | ... | STA2000 |
| --- | --- | --- | --- | --- | --- | --- | --- | --- | --- | --- |
| Bitmap: | 0 | 0 | 1 | 0 | 1 | 0 | 0s | 1 | 0s | 1 |

Referring to Table 2, all of a bit corresponding to STA3 through a bit corresponding to STA2000 are included in a single TIM element.

According to an embodiment, the enhanced TIM frame may include only TIM information about a corresponding STA group for each STA group.

In Table 2, STA3 through STA5 may be grouped into a single group, for example, STA Group1, STA1995 through STA2000 may be grouped into another single group, for example, STA Group2, 101 may be included in a bitmap of STA Group1, and 100001 may be included in a bitmap of STA Group2. The above two TIM IEs may be included a single TIM frame.

The No. of HEW TIM IE field 830 of the enhanced TIM frame indicates the number of TIM IEs. A plurality of TIM IEs may be used.

In a single TIM IE, an STA group field indicates a bitmap of an STA group included in the corresponding TIM IE. The station group field is indicated using a smallest AID and a largest AID among AIDs allocated to STAs that belong to the same STA group. The station group field indicates STAs that belong to the same STA group within the above range.

For example, when the STA group field is indicated as 3 octets, an AID includes 12 bits and thus, a start AID and an end AID may be indicated. STA Group1 in Table 2 may be indicated as expressed by the following Table 3.

TABLE 3

| Xxxxxxxxxxxx (STA3 AID 12 bit) | xxxxxxxxxxxx (STA5 AID 12 bit) |
| --- | --- |

As shown in Table 3, STA Group 1 is indicated as 3 octets, STA3 through STA5 constitute a single STA group, and a TIM bitmap about STA3 through STA5 are included in a corresponding TIM IE.

In an example in which wakeup periods of STAs are the same or in a multiple relationship when the AP allocates an AID, the AP may allocate adjacent AIDs to the STAs. In this case, a TIM bitmap may become further efficient.

That is, in many cases, STAs of which wakeup periods are the same or in a multiple relationship may wake up simultaneously. When the wakeup periods of the STAs are the same, the AP may allocate the STAs to the same STA group. When the wakeup periods of the STAs are in the multiple relationship, the AP may allocate the STAs to different STA groups. Here, the AP may include TIM IE(s) about the STA group(s) to be included in the same TIM frame and may transmit the TIM frame at a point in time at which the corresponding STA group wakes up. When only a TIM element about an STA group that wakes up at a corresponding point in time is included in a TIM frame, a size of a TIM bitmap may decrease. In the related art, since the TIM frame transmits a partial virtual bitmap about the entire TIM bitmap, a size of the TIM frame is large. However, according to an embodiment, by transmitting TIM elements to a plurality of STAs through a one-time TIM frame transmission, it is possible to decrease a traffic increase according to a transmission of a second beacon in addition to a first beacon. For example, the AP may transmit TIM elements about all of STAs of which wakeup periods are the same as "2" or of which wakeup periods are "2" and "4" through a one-time TIM broadcast. Here, since the entire TIM bitmap is not transmitted, a size of a TIM frame is relatively small. In addition, a probability that an STA is capable of receiving a TIM frame at a wakeup point in time of the STA may increase. Accordingly, the STA has no need to wake up further frequently than a wakeup period of the STA in order to receive the TIM frame.

The same type of STAs may be allocated to belong to the same STA group. Since a legacy STA does not support a TIM frame, 11ax STAs supporting the enhanced TIM frame may not be allocated to the same STA group by allocating continuous AIDs thereto.

The TIM broadcast period indicates a TIM broadcast interval about a corresponding STA group and, for example, may be represented as multiples of a beacon interval.

The AP may include, in a bitmap, only a TIM bit of an STA that wakes up at a specific TIM broadcast point in time. In this case, a size of the TIM element may be further reduced.

An old type STA that cannot decode the existing TIM frame or the enhanced TIM frame cannot decode a TIM bitmap of the TIM frame. Accordingly, although TIM bitmaps about old type STAs are set to "1", "1" may be indicated only in a TIM bitmap of a beacon and "0" may be set in a TIM bitmap of a TIM element transmitted through a TIM broadcast. Through this, it is possible to further reduce a size of a partial virtual bitmap of a TIM element of the TIM frame.

According to another embodiment, only a portion of 11ax STAs, for example, STAs that wake up at not a transmission point in time of a first beacon but a TIM broadcast point in time, may be set to receive TIM information only through a TIM broadcast. TIM bitmaps about the STAs may be set to "0" at the transmission point in time of the first beacon. Even in this case, similar to the aforementioned example, a size of a partial virtual bitmap to be included in the first beacon may be further reduced.

Figure 10:
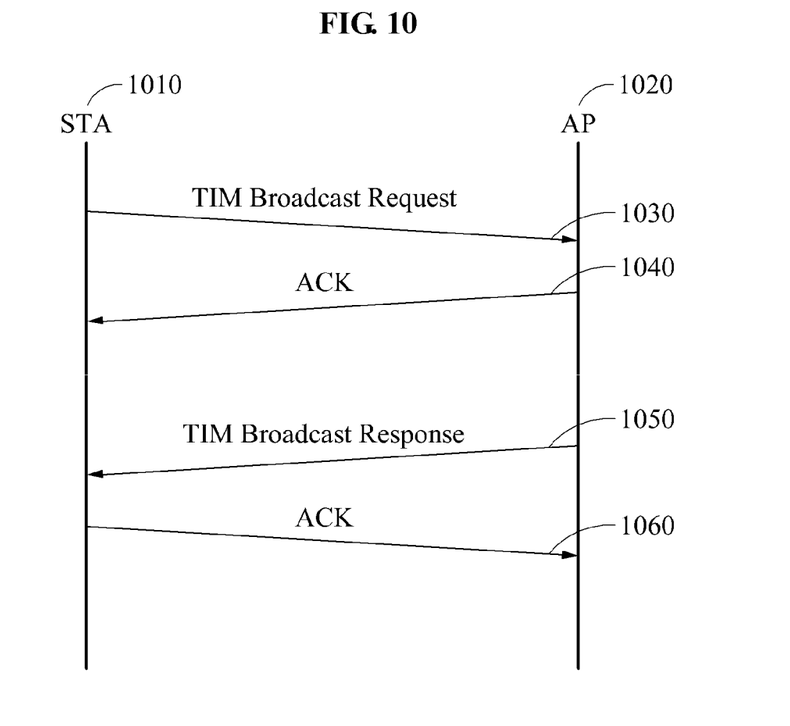
FIG. 10 illustrates a method of modifying a TIM broadcast interval according to an embodiment.

FIG. 10 illustrates a method of modifying a TIM Broadcast Interval according to an embodiment.

At an association time or an after-association time, an STA may request an AP to modify a TIM broadcast interval by transmitting a TIM broadcast request element to the AP.

Referring to FIG. 10, an STA 1010 may request a reallocation by transmitting a TIM broadcast request to an AP 1020 in operation 1030. The AP 1020 may inform the STA 1010 of a modified TIM broadcast interval, status, and the like, by transmitting an acknowledgement (ACK) to the STA 1010 in operation 1040, and by transmitting a TIM broadcast response to the STA 1010 in operation 1050. The AP 1020 may allocate, to the STA 1010, a TIM broadcast interval in which only 11ax STA is included. The STA 1010 may transmit an ACK to the AP 1020 in operation 1060.

To apply STA grouping, STAs of which wakeup periods are similar may be allocated to the same STA group. However, after association, an STA may change its wakeup period. In this case, the STA may request a modification for a TIM broadcast interval by transmitting a TIM broadcast request to an AP. When modifying the TIM broadcast interval, the AP may reallocate, to a corresponding STA, an AID adjacent to AIDs allocated to STAs similar to the corresponding STA, and may reallocate STAs having similar TIM broadcast intervals to the same STA group.

To this end, it is possible to change an AID of an STA and to allocate the STA to a new STA group by including a reallocated AID in a TIM broadcast response and by transmitting the TIM broadcast response to the STA.

Figure 11:
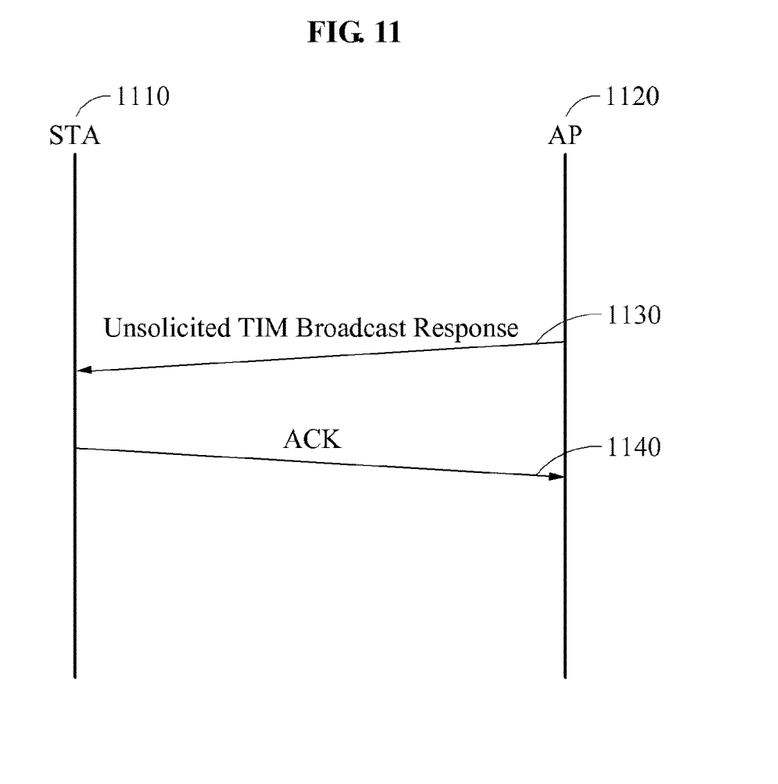
FIG. 11 illustrates a method of modifying a TIM broadcast interval based on an unsolicited TIM broadcast response according to an embodiment.

FIG. 11 illustrates a method of modifying a TIM Broadcast Interval based on an Unsolicited TIM Broadcast Response according to an embodiment.

Without a separate request, the number of STAs having different TIM broadcast intervals in a BSS may significantly increase. In this case, an AP may allocate STAs having similar time broadcast intervals to the same TIM broadcast interval and may also reallocate an AID to an STA in order to reduce overhead by frequent TIM broadcast.

Referring to FIG. 11, an AP 1120 having reallocated an AID may transmit an unsolicited TIM broadcast response to an STA 1110 in operation 1130, and may inform the STA 1110 that a TIM broadcast interval is modified and the AID is reallocated. In operation 1140, the STA 1110 may transmit an ACK to the AP 1120.

As described above, by enhancing an existing TIM broadcast and enabling 11ax STA to perform channel access at a transmission point in time different from a transmission point in time of a first beacon using the enhanced TIM broadcast, it is possible to prevent a degradation in the performance occurring due to coexistence of a legacy STA and to prevent traffic from increasing at the transmission point in time of the first beacon. Further, it is possible to reduce overhead occurring due to transmission of a TIM element by optimizing an 802.11 TIM bitmap.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tapes; optical media such as CD ROMs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments have been shown and described, those skilled in the art may make various alterations and modifications from the description. For example, appropriate results may be achieved by performing the aforementioned technologies in order different from the aforementioned methods, and/or by combining constituent elements such as systems, structures, devices, circuits, and the like, in forms different from the methods, or by substituting or replacing the constituent elements with other constituent elements or their equivalents. Accordingly, other implementations, other embodiments, and the equivalents of the claims are to belong to the scope of the claims.

What is claimed is:

1. A wireless communication method performed at an access point, the method comprising:
scheduling a transmission time of an enhanced traffic indicator map (TIM) frame;
transmitting a first beacon for a first station (STA) being incapable of decoding the enhanced TIM frame or for a second STA being capable of decoding the enhanced TIM frame; and
transmitting a second beacon including the enhanced TIM frame for the second STA being capable of decoding the enhanced TIM frame, at a point in time aside from a transmission point in time of the first beacon,
wherein a time length of the second beacon is less than a time length of the first beacon,
wherein the enhanced TIM frame comprises at least one TIM information element, the at least one TIM information element comprising information on a corresponding STA group,
wherein the enhanced TIM frame comprises a field including information on a number of the at least one TIM information element, and
wherein a same TIM broadcast interval is allocated to second STAs having adjacent TIM broadcast intervals.

2. The method of claim 1, wherein the scheduling comprises allocating the same type of second STAs to the same TIM broadcast interval based on a power saving period.

3. The method of claim 1, further comprising:
receiving a request for a TIM broadcast interval from the second STA.

4. The method of claim 1, wherein the scheduling comprises scheduling the transmission time of the enhanced TIM frame to be the same interval in response to the number of power saving second STAs being less than a threshold.

5. The method of claim 1, wherein the scheduling comprises transmitting information on a TIM broadcast interval or a modified TIM broadcast interval to the second STA and allocating the second STA to a TIM broadcast group.

6. The method of claim 5, wherein the enhanced TIM frame comprises TIM information about second STAs included in the TIM broadcast group.

7. The method of claim 1, further comprising:
receiving a power save (PS)-poll from each of a plurality of second STAs; and
simultaneously transmitting buffered data to the plurality of second STAs by performing downlink orthogonal frequency division multiple access (OFDMA) scheduling based on feedback information included in the PS-poll.

8. A wireless communication method performed at a second station (STA), the method comprising:
receiving, from an access point at a point in time aside from a reception point in time of a first beacon, a second beacon including an enhanced traffic indicator map (TIM) frame; and
attempting a channel access at a transmission point in time of the second beacon based on TIM information in response to the second STA being capable of decoding the TIM frame;
wherein a time length of the second beacon is less than a time length of the first beacon,
wherein the enhanced TIM frame comprises at least one TIM information element, the at least one TIM information element comprising information on a corresponding STA group,
wherein the enhanced TIM frame comprises a field including information on a number of the at least one TIM information element,
wherein the first beacon is for a first STA being incapable of decoding the enhanced TIM frame or the second STA being capable of decoding the enhanced TIM frame, and the second beacon is for the second STA being capable of decoding the enhanced TIM frame, and
wherein a same TIM broadcast interval is allocated to second STAs having adjacent TIM broadcast intervals.

9. The method of claim 8, further comprising:
verifying whether a TIM bit of the second STA is included in the TIM frame, in response to the second STA being capable of decoding the TIM frame; and
transmitting a PS-poll to the access point in response to the TIM bit of the second STA being included in the TIM frame.

10. The method of claim 8, further comprising:
requesting a modification of a TIM broadcast interval by transmitting a TIM broadcast request to the access point.

11. The method of claim 8, wherein the attempting comprises transmitting, to the access point, feedback information included in a PS-poll.

12. An access point comprising:
a processor configured to schedule a transmission time of an enhanced traffic indicator map (TIM) frame; and
a communicator configured to:
  transmit a first beacon for a first station (STA) being incapable of decoding the enhanced TIM frame or for a second STA being capable of decoding the enhanced TIM frame; and
  transmit a second beacon including the enhanced TIM frame for the second STA being capable of decoding the enhanced TIM frame, at a point in time aside from a transmission point in time of a first beacon,
wherein a time length of the second beacon is less than a time length of the first beacon,
wherein the enhanced TIM frame comprises at least one TIM information element, the at least one TIM information element comprising information on a corresponding STA group,
wherein the enhanced TIM frame comprises a field including information on a number of the at least one TIM information element, and
wherein the processor is further configured to allocate a same TIM broadcast interval to second STAs having adjacent TIM broadcast intervals.

13. The access point of claim 12, wherein the processor is further configured to allocate the same type of second STAs to the same TIM broadcast interval based on a power saving period.

14. The access point of claim 12, wherein the processor is further configured to allocate adjacent association IDs (AIDs) to second STAs of which wakeup periods are the same or in a multiple relationship.

15. The access point of claim 12, wherein the processor is further configured to allocate the same TIM broadcast interval to the second STAs having adjacent TIM broadcast intervals, without a request from the second STAs in response to a predetermined or more number of the second STAs having different TIM broadcast intervals, and to reallocate AIDs of the STAs.

16. The access point of claim 12, wherein the communicator is further configured to transmit a TIM broadcast response comprising information on a TIM broadcast interval or a modified TIM broadcast interval.

17. The access point of claim 12, wherein the access point allocates the second STA to a TIM broadcast group by transmitting an unsolicited TIM broadcast response.

18. The access point of claim 12, wherein the enhanced TIM frame further comprises information on a TIM broadcast interval for the corresponding STA group.

19. The method of claim 1, wherein the enhanced TIM frame further comprises information on a TIM broadcast interval for the corresponding STA group.

20. The method of claim 8, wherein the enhanced TIM frame further comprises information on a TIM broadcast interval for the corresponding STA group.

* * * * *